No. 772,136. PATENTED OCT. 11, 1904.
J. J. DOSSERT.
PIPE COUPLING.
APPLICATION FILED NOV. 28, 1903.
NO MODEL.

Witnesses
Harry L. Ames.
J. Granville Meyers

Inventor
John J. Dossert.
By
George H. Stockbridge,
Attorney

No. 772,136. Patented October 11, 1904.

UNITED STATES PATENT OFFICE.

JOHN J. DOSSERT, OF NEW YORK, N. Y., ASSIGNOR, BY DIRECT AND MESNE ASSIGNMENTS, TO DOSSERT & COMPANY, A CORPORATION OF NEW YORK.

PIPE-COUPLING.

SPECIFICATION forming part of Letters Patent No. 772,136, dated October 11, 1904.

Application filed November 28, 1903. Serial No. 182,965. (No model.)

*To all whom it may concern:*

Be it known that I, JOHN J. DOSSERT, a citizen of the United States, and a resident of New York, county of New York, State of New York, have invented certain new and useful Improvements in Pipe-Couplings, of which the following is a specification.

My invention relates to pipe-couplings designed for detachably connecting the meeting ends of pipes, and is especially adapted to connect pipes at least one of which is made of a compressible material, such as lead, rubber, or the like.

The object of the invention is to provide an improved and effective coupling by means of which the pipes may be detachably united and which will obviate all tendency to leakage at the point of union.

I have fully and clearly illustrated my invention in the accompanying drawings, to be taken as a part of this specification, and wherein—

Figure 1:
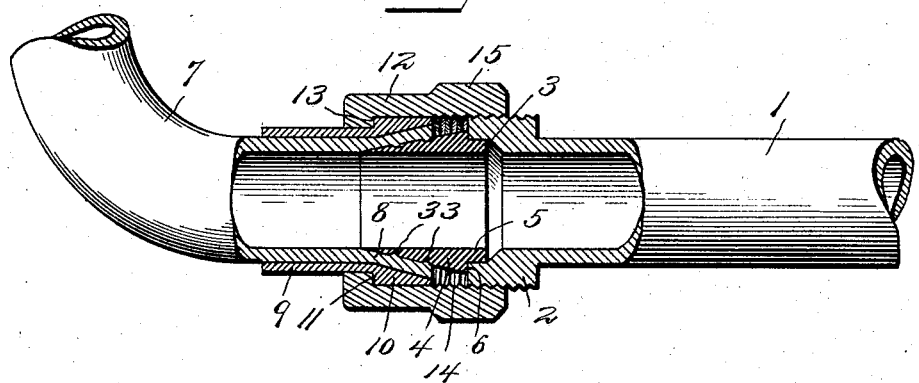
Figure 2:
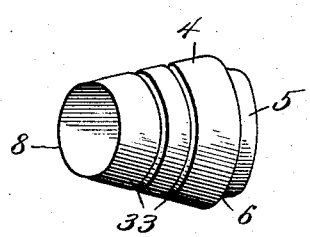

Figure 1 is a view, partly in longitudinal section, of a coupling embodying my present invention shown as connecting a lead pipe to a rigid pipe, such as is attached to any ordinary gas-meter. Fig. 2 is a perspective view of the hollow cone employed in connection with the invention, and Fig. 3 is a partly-sectional view of the coupling as employed to couple a compressible pipe to a gas-meter cock or other valve-casing.

Referring to the drawings, 1 in Fig. 1 designates a rigid pipe, such as is ordinarily attached to the side of a gas-meter, said pipe being provided at the end opposite to that connected with the meter with an exterior-screw-threaded flange 2. The interior of the flanged end of this pipe 1 is enlarged or cored out to provide an interior annular shoulder 3, constituting a seat, which serves a purpose to be made more clearly apparent hereinafter. It is customary in coupling these meter-pipes to take measurements as to the distance between the proposed location of the meter and the terminus of the pipe system and then to attach, by soldering or otherwise, a lead pipe to the meter and afterward make the connection by similar means between the opposite end of the lead pipe and the iron pipe running through the building. This necessitates inconvenience, it being usually inexpedient to do the soldering on the spot, and altogether the expense and trouble accompanying the connecting up of a meter are considerable. In the structure embodying my present invention I arrange upon the end of the rigid pipe 1 a hollow cone 4 the bore of which is approximately the same as the passage through the pipe and which is disposed in longitudinal alinement therewith. This hollow cone is provided at its base with a cylindrical portion 5 of less diameter than the base of the cone, whereby the said cone is provided with an annular exterior shoulder 6. When the cone is arranged in operative position upon the end of the rigid pipe, the cylindrical portion 5 of said cone is inserted within the interior enlarged portion of said pipe, with its rear edge resting upon the shoulder or seat 3 and with the base or shoulder 6 of the cone resting upon the end of the pipe 1.

The cone having been arranged in position as above described, the end of the lead or other compressible pipe 7 which is to be the means of connection between the meter-pipe 1 and the terminal of the distributing system is placed over the reduced or outer end portion 8 of the cone, and I then arrange around the compressible pipe a cylindrical sleeve 9, of brass or other rigid material, the same being spread at its junction end to have a conical interior engaging portion 10, which is adapted to engage that exterior portion of the pipe 7 adjacent the cone 4. This sleeve 9 is provided on its outer surface adjacent its forward end with an annular shoulder 11, and over said sleeve is arranged a rigid locking-collar 12, provided at its rear end with an interior annular shoulder 13, adapted to coöperate with the shoulder 11 on the sleeve 9. The forward or junction end of the locking-collar 12 is internally screw-threaded, as at 14, and adapted to engage the externally-screw-threaded flange 2 on the pipe 1. The parts being arranged in relative position, as above described, a wrench or other tool is applied to the enlarged end 15 of the locking-collar 12, which end is angular in shape to permit of effective engagement of the tool therewith, and by screwing said collar upon the flange 2 the junction end of the pipe 7 is spread until it fills the conical enlargement 10 of the sleeve 9, while a continued turning of the locking-collar makes a tight joint owing to the fact that the shoulders 13 and 11 on the locking-collar and sleeve coact to cause a gradual forward movement of the sleeve 9 until the parts constituting the coupling are brought into close interengagement.

Figure 3:
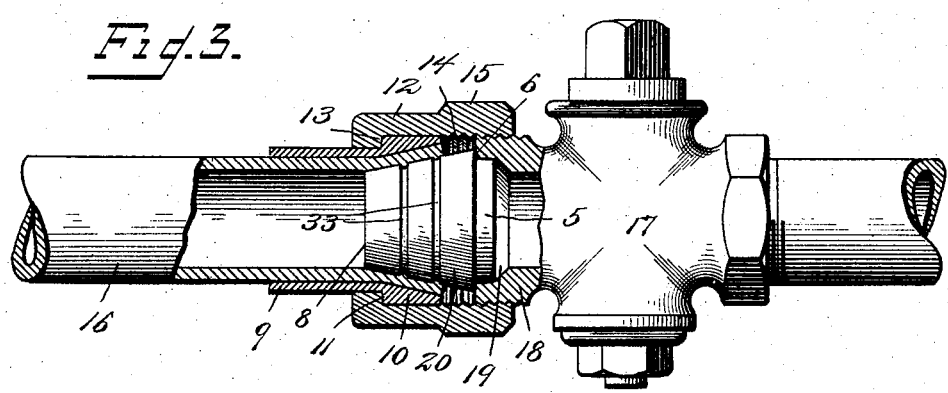

In Fig. 3 is illustrated the invention as applied for uniting a lead pipe 16 to a valve or meter-cock 17, such meter-cocks being, as a rule, provided with a screw-threaded flange 18 and enlarged end portion 19 similar to that shown on the pipe 1 in Fig. 1, and in said enlarged portion I may seat a conical connecting-piece 20, such as appears at 5 in Fig. 1. The other parts, consisting of the sleeve 9, having the conical enlargement 10 and shoulder 11, the locking-collar 12, having the shoulder 13 and internal screw-threads 14 and enlarged end 15, are similar to the corresponding parts in Fig. 1.

I prefer to provide the hollow cone 4 of the coupling with one or more circumferential grooves 33, whereby a somewhat more perfect seal is produced when the parts are firmly coupled together, owing to the fact that when under compression a portion of the compressible pipe will be forced into said grooves.

In the claims which follow it will be understood that wherever the word "pipe" is used it may refer also to the terminal of a cock or other element of a distribution system for fluids. It will also be understood that the system of coupling described in this specification is applicable to pipes for conveying any fluid, whether gas, steam, water, or any other fluid such as is usually distributed in pipes for any purpose.

In performing the coupling operation for the joint shown in Fig. 1 the coupling-section 12 is generally first placed over the sleeve or cylinder 9 and the latter is slipped over the end of the pipe 7. By means of some convenient tool the end of the said pipe is then spread against the conical surface at the end of the sleeve, and the coupling-section is then tightened on the flange 2 to complete the union.

I claim as my invention—

1. The combination with the meeting ends of pipes, of a hollow cone provided with an annular exterior shoulder, the base of said cone being arranged within the end of one of the pipes and the shoulder resting upon the end of said pipe, the reduced end of the cone being inserted in the opposite pipe, and means to secure the pipes together.

2. The combination with the meeting ends of pipes, one of which is provided with an interior enlargement, of a hollow cone provided with an annular exterior shoulder, the base of said cone being seated within said enlargement of said pipe, the shoulder of the cone resting against the end of the pipe, and the reduced end of the cone being inserted in the opposite pipe, and means to secure the pipes together.

Signed at New York, in the county of New York and State of New York, this 24th day of November, A. D. 1903.

JOHN J. DOSSERT.

Witnesses:
 WM. H. CAPEL,
 GEORGE H. STOCKBRIDGE.